United States Patent [19]
Sakai

[11] Patent Number: 5,815,263
[45] Date of Patent: Sep. 29, 1998

[54] DOUBLE BEAM SPECTROPHOTOMETER

[75] Inventor: Masumi Sakai, Kyoto, Japan

[73] Assignee: Shimadzu Corporaton, Kyoto, Japan

[21] Appl. No.: 865,868

[22] Filed: May 30, 1997

[30] Foreign Application Priority Data

Jun. 11, 1996 [JP] Japan ................................. 8-148867

[51] Int. Cl.⁶ ............................................... G01J 3/42
[52] U.S. Cl. .......................................... 356/323; 356/325
[58] Field of Search ................................. 356/319, 320, 356/323, 325

[56] References Cited

U.S. PATENT DOCUMENTS 3,459,481  8/1969  Boronkay ........................ 356/325
4,516,857  5/1985  Preston et al. ..................... 356/418
4,709,195  11/1987  Hellekson et al. ................. 318/254

*Primary Examiner*—F. L. Evans
*Attorney, Agent, or Firm*—Kanesaka & Takeuchi

[57] ABSTRACT

A double-beam spectrophotometer of the invention is provided with a sector mirror used at a luminous flux separating portion or at a luminous flux combining portion, and a DC brushless motor is used for actuating the sector mirror to rotate. Since the DC brushless motor is used, the sector mirror can be rotated at high speed with few noise. Also, the double-beam spectrophotometer can measure the change in the short period of time.

3 Claims, 1 Drawing Sheet

DOUBLE BEAM SPECTROPHOTOMETER

BACKGROUND OF THE INVENTION AN RELATED ART STATEMENT

The present invention relates to a double beam spectrophotometer, and more particularly, relates to a double beam spectrophotometer in which a sector mirror separates incident light or combines measured lights.

A double beam spectrophotometer divides a luminous flux from a light source into two fluxes such that one of the fluxes illuminates a sample, and the other of the fluxes illuminates a reference sample (including air). The two fluxes may be combined again to enter one detector, or without being combined, the two fluxes respectively enter or radiate two detectors. And, according to detection signals by these two fluxes, fluctuation of the light source is compensated, or difference of absorption for light between the sample and the reference sample is measured.

In a dividing section and a combining section of the luminous flux, in many cases, a mirror called a sector mirror is rotated to change a route of the flux by a time division system.

Conventionally, an AC synchronous motor has been generally used in a driving section for the sector mirror. This is because the AC synchronous motor is strong and endurable to continuous operation for a long time; it does not require a control device since the AC synchronous motor can be actuated by simply connecting to a commercial power source; and constant-speed rotation can be secured since the AC synchronous motor rotates synchronously to a phase of the power source.

However, the aforementioned prior art has several problems, as follows. If data are obtained in an interval (sampling period) shorter than a switching period of the sector mirror, the device can not function as the double beam spectrophotometer. Therefore, even if the sampling period is tried to be shortened so as to measure the change in a short period of time, in case the sector mirror is rotated by the AC synchronous motor, it is difficult to make rotation higher than a power source frequency. Thus, if the AC synchronous motor is used to measure a change in a period of time shorter than the power source frequency, a gear head may be required to be attached thereto, or a power source frequency control may be required. Accordingly, in either case, the device becomes expensive and complicated, so that it is unable to provide the device inexpensively.

Furthermore, in the AC synchronous motor, tolerance for fluctuation of a power source voltage is approximately ±10%. Therefore, at a place in which the power source voltage fluctuates more than this tolerance, or in an area in which the power source voltage is totally different, such as overseas, the AC synchronous motor does not rotate normally, so that it requires a stabilized power source or a voltage converter separately.

On the other hand, when a DC motor is used, since a number of rotation of the DC motor can be easily changed according to the applied voltage, the aforementioned problem can be solved. However, since a brush is generally built in the DC motor, in view of the fact that the sector mirror is always rotated during the measurement, the DC motor has a short life. Also, a contact portion by the brush can be a cause of the noise, which causes a bad effect to a micro-signal measurement of the spectrophotometer. Therefore, the DC motor could not be used.

Accordingly, an object of the present invention is to provide a double beam spectrophotometer, which can measure a change in a short period of time, and which can be provided inexpensively.

Further objects and advantages of the invention will be apparent from the following description of the invention.

SUMMARY OF THE INVENTION

To achieve the above object, the present invention provides a double beam spectrophotometer which includes a DC brushless motor for driving a sector mirror which rotates to divide a luminous flux into a sample side and a reference side or to combine the fluxes separated before. In the DC brushless motor, a number of rotation thereof can be changed easily responding to the highest frequency of a measured signal, and there is caused almost no noise since the motor itself does not have a brush. Therefore, the sector mirror can be rotated at a high speed while noise generation is prevented.

A number of rotation of the motor has to satisfy the following formula (1):

$$\text{A number of rotation } (/s) \geq 2 \times f \div n \qquad (1)$$

2: constant according to Sampling (Nyquist) theorem
f: highest frequency of measured signal (Hz)
n: number of blades of the sector mirror.

Here, n=2 is usually used. This is because the luminous flux has a certain size, so that if n is increased, a number of changeover times between the sample side flux and the reference side flux is increased while the sector mirror is rotated once; consequently, a proportion of time for which the flux passes through only one side of the mirror, i.e. time for which data are effective, is decreased, to thereby deteriorate utilization efficiency of light. Furthermore, in case n is extremely increased, an area of one blade of the sector mirror becomes smaller than the luminous flux, so that the mirror can not completely separate the sample side flux and the reference side flux.

The number of the rotation of the motor is set so as to satisfy the formula (1). As methods for the above setting, there are selection of a rated number of rotation, adjustment of load, and adjustment of power source voltage, so as to facilitate various and easy selections.

DETAILED DESCRIPTION OF A PREFERRED EMBODIMENT

Figure 1:
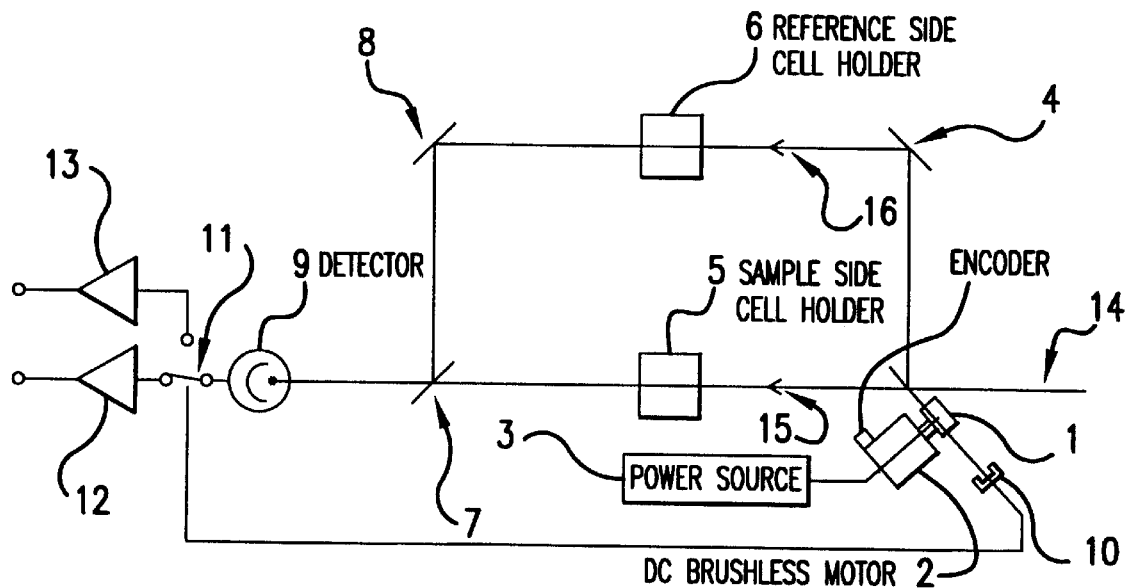
FIG. 1 is a structural view of a double beam spectrophotometer of an embodiment of the invention.
Figure 2:
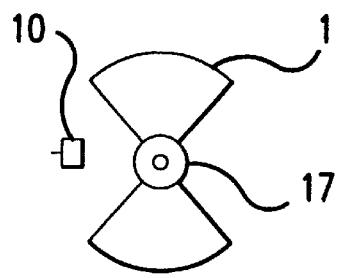
FIG. 2 is a front view of a sector mirror.

In FIG. 1, a structural view of a double beam spectrophotometer of an embodiment of the invention is shown. Numeral 14 designates an incident light, that is, light sent from a light source, such as a deuterium lamp, not shown. Numeral 1 designates a sector mirror which is structured such that two blades finished as mirror surfaces are attached to a mirror fixing member 17 as shown in detail in FIG. 2. The sector mirror 1 is connected to a DC brushless motor 2 for driving, and the DC brushless motor 2 is set to rotate in a predetermined number of rotation which satisfies the formula (1) by controlling a power source 3.

When the sector mirror 1 does not intercept the incident light, the incident light advances into a sample side to become a sample side flux 15, and enters into a sample provided in a sample side cell holder 5. Although the flux which has passed through the sample is partially reflected by a half mirror 7, the rest of the flux advances straight to reach a detector 9.

When the sector mirror 1 is rotated and intercepts the incident light, the incident light is wholly reflected by the mirror surface of the sector mirror 1, and is further reflected by a mirror 4 to advance to the reference side, so that the light becomes a reference side flux 16 and enters into a reference side cell holder 6. The reference cell holder 6 may contain no sample but air in many cases. The luminous flux which has passed through the reference side cell holder 6 is reflected by a mirror 8, and then, it advances straight in part at the half mirror 7, but the rest of the flux is reflected by the half mirror 7 and reaches the detector 9.

Since an output signal from the detector 9 is a combination of or overlapping with both the signal of the sample side flux 15 and the signal of the reference side flux 16 due to the time division system by the sector mirror, if a transfer switch 11 is switched appropriately by synchronizing with a signal of a photo-interrupter 10 attached to the sector mirror 1, a signal showing the strength of the sample side flux and a signal showing the strength of the reference side flux can be respectively taken from a sample side amplifier 12 and from a reference side amplifier 13.

Although a process hereafter is not shown in the figure, data may be recorded or processed by preferably connecting to a graphic meter or converting analog to digital so as to take data into a micro processor system.

In the embodiment of the invention, the sector mirror is provided at a luminous flux separating part before passing through the sample, and the half mirror is provided at a luminous flux combining part. Alternatively, if the sector mirror is provided at a position of the half mirror 7 in FIG. 1, i.e. the luminous flux combining part, the same effect can be obtained.

Although the embodiment is a pre-monochromator system in which the monochromator is disposed in an upstream side of the sample, the invention can be used in a post-monochromator system in which the monochromator is disposed in a downstream side of the sample.

Further, although the rotation number is fixed in the embodiment, in case the highest frequency of the observed signal is various, the rotation number can be changed within the condition of formula (1).

Although the embodiment is explained for the example of the measurement based on the change of time, the invention can be used for spectrum measurement in which a wavelength of the incident light changes as time progresses.

In the present invention, since the luminous flux separating part or the luminous flux combining part is provided with the DC brushless motor, measuring within a short sampling period can be made inexpensively.

Since the number of rotation can be changed easily in accordance with the highest frequency of the signal to be measured, in case the highest frequency thereof is low, the number of rotation may be simply decreased. As a result, noise of the signal due to switching of the luminous flux, or consumption of electricity for the motor can be lowered.

Since a required power source is a direct current, if a switching power source is used, it is possible to use a commercial power source or to respond to a change of voltage and frequency.

Since the DC brushless motor does not have a brush, it has a long life and does not substantially make a noise, so that the bad effect for a micro-signal measurement is very low. In order to further prolong the life of the motor, the motor can be rotated in a lower speed or stopped while it is not measuring.

In many cases, the DC brushless motor may have a simple encoder built therein, and by utilizing a signal of the encoder, the sector mirror can be stopped at a predetermined position. Accordingly, by a single spectrophotometer, double-beam measurement and single-beam measurement can be achieved.

While the invention has been explained with reference to the specific embodiments of the invention, the explanation is illustrative and the invention is limited only by the appended claims.

What is claimed is:

1. A double-beam spectrophotometer comprising:
   a sector mirror provided at at least one of a luminous flux separating portion for dividing a luminous flux from a light source, and a luminous flux combining portion for combining luminous fluxes separated before,
   a DC brushless motor connected to the sector mirror for rotating the same, a number of rotation of said DC brushless motor being determined by the following formula (1):

$$\text{a number of rotation } (/s) \geq 2 \times f \div n \tag{1}$$

wherein 2 is constant according to Sampling theorem, f is highest frequency of measured signal (Hz), and n is a number of blades of the sector mirror, and
   an encoder attached to said DC brushless motor to stop the motor at a desired position to achieve one of a double-beam measurement and a single-beam measurement.

2. A double-beam spectrophotometer according to claim 1, wherein a number of rotation of the DC brushless motor can be changed according to high frequency of the signal to be measured.

3. A double-beam spectrophotometer according to claim 1, further comprising a photo-interrupter cooperating with the sector mirror to provide a signal relative to a rotation of the sector mirror.

* * * * *